(12) United States Patent
Nishioka et al.

(10) Patent No.: US 8,740,420 B2
(45) Date of Patent: Jun. 3, 2014

(54) AIR CONDITIONER THAT ENABLES DEODORIZING USING A PHOTOCATALYST

(75) Inventors: Yuusaku Nishioka, Kariya (JP); Tomohide Nishino, Nagoya (JP)

(73) Assignee: Denso Corporation, Kariya (JP)

( * ) Notice: Subject to any disclaimer, the term of this patent is extended or adjusted under 35 U.S.C. 154(b) by 141 days.

(21) Appl. No.: 13/347,111

(22) Filed: Jan. 10, 2012

(65) Prior Publication Data

US 2012/0180998 A1    Jul. 19, 2012

(30) Foreign Application Priority Data

Jan. 14, 2011  (JP) ................................. 2011-006095
Dec. 2, 2011  (JP) ................................. 2011-265136

(51) Int. Cl.
*F21V 29/00* (2006.01)
*B60Q 1/06* (2006.01)

(52) U.S. Cl.
USPC ............................................ 362/373; 62/78

(58) Field of Classification Search
USPC ........ 165/104.34, 133; 362/373, 580; 96/224; 62/317, 264, 78
See application file for complete search history.

(56) References Cited

U.S. PATENT DOCUMENTS

| | | | |
|---|---|---|---|
| 5,472,915 A * | 12/1995 | Schairer et al. ................. | 438/25 |
| 6,182,461 B1 * | 2/2001 | Washburn et al. .............. | 62/264 |
| 6,909,459 B2 * | 6/2005 | Watson et al. ............. | 348/229.1 |
| 2002/0062951 A1 * | 5/2002 | Kuno et al. .................... | 165/148 |
| 2004/0170537 A1 * | 9/2004 | Hara .............................. | 422/122 |
| 2007/0217193 A1 * | 9/2007 | Lin et al. ....................... | 362/245 |
| 2009/0154137 A1 * | 6/2009 | Bierhuizen et al. ............. | 362/84 |
| 2011/0186833 A1 * | 8/2011 | Iwasaki ........................... | 257/40 |

FOREIGN PATENT DOCUMENTS

| | | |
|---|---|---|
| JP | 11-314017 | 11/1999 |
| JP | 2000-255257 | 9/2000 |
| JP | 2001-205094 | 7/2001 |
| JP | 2002-055257 | 2/2002 |
| JP | 2006038355 A * | 2/2006 |
| WO | WO 2010024136 A1 * | 3/2010 |

OTHER PUBLICATIONS

JP 2006038355A Machine English Translation Feb. 2006 Uchinda, Yoshiaki.*
Office action dated Jan. 8, 2014 in corresponding Chinese Application No. 201210010389.9.

* cited by examiner

*Primary Examiner* — Nimeshkumar Patel
*Assistant Examiner* — Glenn Zimmerman
(74) *Attorney, Agent, or Firm* — Harness, Dickey & Pierce, PLC (57) ABSTRACT

An air conditioner includes: an air conditioning case having an air passage; a heat exchanger arranged to cross the air passage; a photocatalyst arranged on a surface of the heat exchanger; and an emitting portion which emits light for activating the photocatalyst. The photocatalyst decomposes odor component contained in air. The air conditioning case has a bent portion at upstream or downstream of the heat exchanger, so as to change a flowing direction of the air. The emitting portion is disposed on a wall part of the bent portion, and the wall part is located to oppose to the heat exchanger.

16 Claims, 5 Drawing Sheets

AIR CONDITIONER THAT ENABLES DEODORIZING USING A PHOTOCATALYST

CROSS REFERENCE TO RELATED APPLICATION

This application is based on Japanese Patent Application No. 2011-6095 filed on Jan. 14, 2011 and Japanese Patent Application No. 2011-265136 filed on Dec. 2, 2011, the disclosures of which are incorporated herein by reference in their entirety.

BACKGROUND OF THE INVENTION

1. Field of the Invention

The present invention relates to an air conditioner.

2. Description of Related Art

JP-A-2000-255257 describes an air conditioner for a vehicle which uses photocatalyst in a heat exchanger. A blower circulates air in a case of the air conditioner, and an evaporator is arranged in the case so as to cool the air. A deodorization filter is provided upstream of the evaporator in a flow of the air. The deodorization filter has adsorbent and photocatalyst. Further, a surface of the evaporator has photocatalyst. Moreover, an ultraviolet ray lamp is disposed between the evaporator and the deodorization filter.

The ultraviolet ray lamp is turned on always or periodically with interval during operation of the blower. The photocatalyst of the deodorization filter is excited by the ultraviolet rays emitted from the lamp toward the deodorization filter, so that odorant adsorbed on the adsorbent is decomposed. The photocatalyst of the evaporator is excited by the ultraviolet rays emitted from the lamp toward the evaporator, so that bacteria on the surface of the evaporator is sterilized.

However, because the ultraviolet ray lamp is arranged at a middle of the case, ventilation air resistance of the air circulating through the case is increased, so that air sending amount of the blower is decreased.

SUMMARY OF THE INVENTION

In view of the foregoing and other problems, it is an object of the present invention to provide an air-conditioner that enables to deodorize using a photocatalyst without an increasing in a resistance of air circulating in a case of the air-conditioner.

According to an example of the present invention, an air conditioner includes an air conditioning case having an air passage; a heat exchanger arranged to cross the air passage, the heat exchanger cooling air for conditioning in the air conditioning case; a photocatalyst arranged on a surface of the heat exchanger, the photocatalyst decomposing odor component contained in the air; and an emitting portion which emits light for activating the photocatalyst. The air conditioning case has a bent portion at upstream or downstream of the heat exchanger, so as to change a flowing direction of the air. The emitting portion is disposed on a wall part of the bent portion, and the wall part is located to oppose to the heat exchanger.

Accordingly, deodorization can be performed without increase in ventilation air resistance.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

A first embodiment will be described with reference to FIGS. 1 and 2. FIG. 2 is a cross-sectional view seen in a direction of II in FIG. 1.

An air-conditioner 100A performs air conditioning for a passenger compartment of a vehicle, for example, and has an air conditioning case 110, an air switching door 120, a blower 130, a deodorization filter 140, an evaporator 150, a photocatalyst 160, and an emitting portion 171.

The air conditioning case 110 has an air passage 111 inside, and air for air conditioning circulates in the passage 111. An inside air inlet 113 and an outside air inlet 114 are defined at a first end of the case 110 as a port for introducing the air for air conditioning from outside and inside, respectively.

The inside air inlet 113 is an opening which introduces inside air of the vehicle, and the outside air inlet 114 is an opening which introduces outside air of the vehicle. The air conditioning case 110 has a bent portion 112 at a middle of the passage 111 between the first end and a second end, so that a flowing direction of the air for air conditioning is changed at the bent portion 112. As shown in FIG. 2, the air passage 111 of the air conditioning case 110 has an L-shape, so that the wall part forming the bent portion 112 is defined by a plane or flat face.

Figure 1:
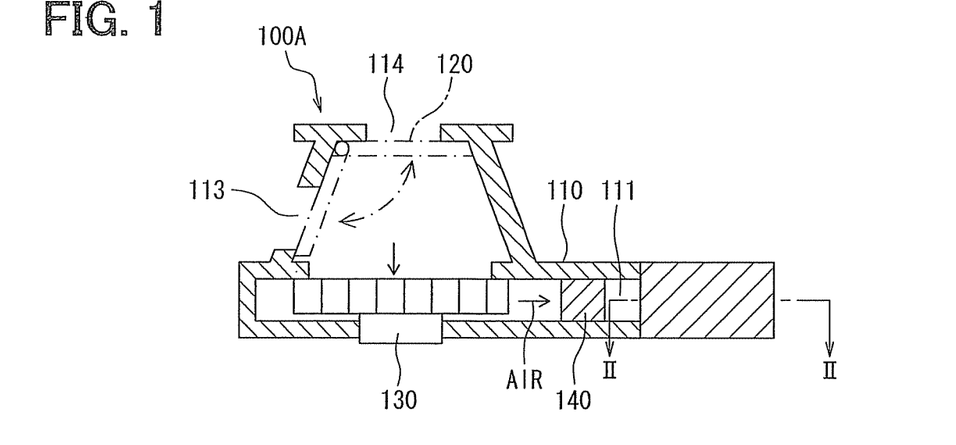
FIG. 1 is a schematic cross-sectional view illustrating an air conditioner according to a first embodiment.
Figure 2:
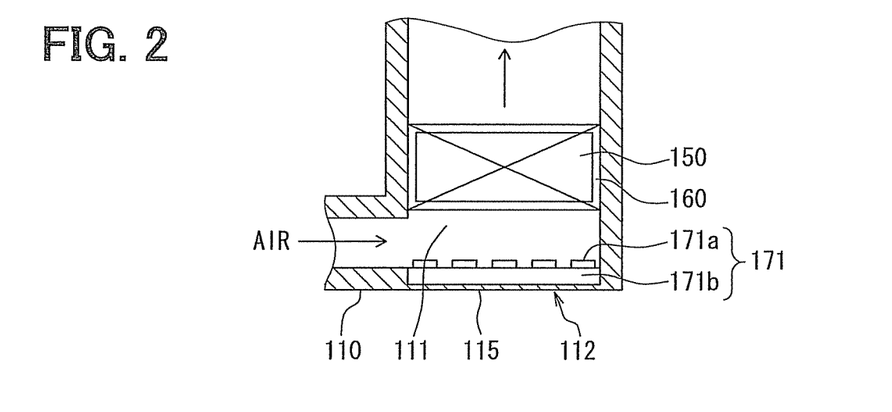
FIG. 2 is a schematic cross-sectional view illustrating an emitting portion of the air conditioner.

The switching door 120 has a board shape, and is moved and rotated in a chain line arrow direction of FIG. 1, so as to open/close the inside inlet 113 and the outside inlet 114. An axis of the door 120 is located between the inside inlet 113 and the outside inlet 114. The door 120 opens/closes the inlet 113, 114, thereby selecting the outside air or the inside air as the air used for the air conditioning.

The blower 130 has a fan (for example, sirocco fan) driven by a motor, and is located downstream of the switching door 120 in the air flow, in the air conditioning case 110. The blower 130 draws the inside air or the outside air selected by the door 120 into the air conditioning case 110 in a continuous-line arrow direction in FIG. 1. Further, the blower 130 sends the air toward the evaporator 150 located on the downstream side as the air used for the air conditioning.

The deodorization filter 140 has adsorbent which adsorbs odor component of the air for the air conditioning sent by the blower 130. The deodorization filter 140 is located downstream of the blower 130 and upstream of the bent portion 112, no as to cross the air passage 111. The adsorbent is powder, such as activated carbon, zeolite, or silica gel, for example.

The evaporator 150 is a heat exchanger for cooling the air for the air conditioning, and is arranged downstream of the bent portion 112 so as to cross the air passage 111. The evaporator 150 has a heat exchange part which is formed by alternately layering refrigerant tubes and corrugated outer fins. A header tank is connected to each end of the heat exchange part. The heat exchange part is located to cross most of the air passage 111. Low temperature and low pressure refrigerant circulates in the refrigerant tube of the heat exchange part.

When the refrigerant evaporates, evaporative latent heat is taken from the air for the air conditioning which passes through the heat exchange part, so that the evaporator 150 cools the air. Antibacterial medicine is applied to the surface of components constructing the evaporator 150 such as refrigerant tube, outer fin, and header tank. That is, the antibacterial treatment is carried out, an that bacterial propagation is prevented.

The photocatalyst 160 is activated in response to light emitted from the emitting portion 171, and decomposes the odor component contained in the air. The photocatalyst 160 is supported by the entire surface of the components of the evaporator 150. The photocatalyst 160 is made of powder of metal oxides, such as titanium oxide or a zinc oxide, or a photocatalyst which is activated by visible light that is described in JP-A-2001-205094 incorporated by reference, for example.

The emitting portion 171 is a parallel-light light source which emits light having a predetermined wave length (for example, ultraviolet light) to the photocatalyst 160 supported by the evaporator 150. As shown in FIG. 2, the emitting portion 171 is disposed on a wall part 115 which defines the bent portion 112 of the air conditioning case 120.

Specifically, the emitting portion 171 is located on the wall part 150 upstream of the evaporator 150. That is, the emitting portion 171 is arranged on the wall part 115 opposing to the heat exchange part of the evaporator 150. The emitting portion 171 of the first embodiment has a light emitting diode (LED) 171a and a radiation board 171b. The LED 171a is a light source which emits light, and the radiation board 171b radiates heat when the LED 171a is turned on.

The LED 171a is a lighting device (lamp) including the light emitting diode. The radiation board 171b opposes to the evaporator 150, and is a board member having rectangular shape approximately equivalent to the outline of the evaporator 150, for example. The radiation board 171b is fixed to the wall part 115, and is excellent in the thermal conductivity.

A plurality of the LEDs 171a are arranged on a face of the radiation board 171b opposing to the evaporator 150, and are located to be distanced from each other. Specifically, the LEDs 171a are, for example, arranged on each intersection of a grid which is defined by imaginary lines extending in vertical and lateral directions at equal intervals.

Next, operation and effect of the air conditioner 100A are explained.

When the air-conditioner 100A is activated, the blower 130 is activated, and the inside inlet 113 or the outside inlet 114 is opened by the switching door 120. Moreover, during the operation of the air-conditioner 100A, the LED 171a is turned on always or periodically with a predetermined time interval.

When the blower 130 is activated, inside/outside is drawn from the inlet 113/114 into the air conditioning case 110, and the drawn air is sent to the downstream side as the air for the air conditioning. In the downstream of the blower 130, the adsorbent of the deodorization filter 140 adsorbs the odor component contained in the air. The air deodorized to some extent is cooled by the evaporator 150, and the cooled air is sent into the passenger compartment.

The photocatalyst 160 supported by the evaporator 150 is activated by the light emitted from the LED 171a arranged on the wall part 115, so that the following super-hydrophilic actions and the decomposing action of the odor component can be achieved. Heat emitted from the LED 171a is radiated outside from the radiation board 171b through the wall part 115 of the air conditioning case 110.

1) Super-Hydrophilic Action

In the evaporator 150, while the air is cooled, if a temperature of the cooled air becomes lower than a dew-point of water, water steam contained in the air will be condensed into condensation water. The generated condensation water makes the entire surface of the evaporator 150 to get wet slightly, due to the super-hydrophilic action of the photocatalyst 160, so that the water does not become a water drop. That is, the condensation water flows and falls downward without being collecting in the wave part of the outer fin, for example. Thereby, the thermal resistance can be restricted from increasing because the water drop is not generated, so that the heat exchanging property of the evaporator 150 can be maintained high.

2) Decomposing Action of Odor Component

It is supposed that the odor component inside/outside of the passenger compartment melts into the condensation water on the surface of the evaporator 150, and that the odor component is emitted into the air when the condensation water dries, thereby the comfortableness is lowered by the odor component. If the photocatalyst 160 decomposes the odor component by the time when the condensation water is dried, the unpleasant odor can be restricted from being generated during the operation of the air-conditioner 100A. Due to the decomposing of the odor component, an amount of the odor component melted into the condensation water can be reduced to a predetermined level.

According to the first embodiment, the emitting portion 171 which emits the light for activating the photocatalyst 160 is arranged on the wall part 115 of the bent portion 112 of the air conditioning case 110 that opposes to the evaporator 150. Therefore, the air passage 111 is not crossed by the emitting portion 171 in the air conditioning case 110. Accordingly, deodorization can be performed in the evaporator 150 by the photocatalyst 160, without causing the increase in the ventilation air resistance in the air conditioning case 110 even when the emitting portion 171 is arranged in the air passage 111. Further, the light is emitted from the emitting portion 171 that is disposed on the wall part 115 opposing to the evaporator 150, so that the light can be effectively emitted to the photocatalyst 160 arranged on the surface of the evaporator 150.

Moreover, the emitting portion 171 is located upstream of the evaporator 150. The odor component contained in the air easily adheres to the evaporator 150 at the upstream side of the air flow. Because the emitting portion 171 is located upstream of the evaporator 150, the light can be emitted from the emitting portion 171 much more efficiently to the part to which the odor component adheres easily. Thus, the odor decomposition effect using the photocatalyst 160 can be raised.

Moreover, the LEDs 717a of the emitting portion 171 are distanced from each other on the radiation board 171b as a plurality of dots. Therefore, the light can be emitted from the whole board 171b of the emitting portion 171, so that the light can be emitted uniformly to the photocatalyst 160 arranged on the evaporator 150. Thus, the odor decomposition effect using the photocatalyst 160 can be raised.

Second Embodiment

Figure 3:
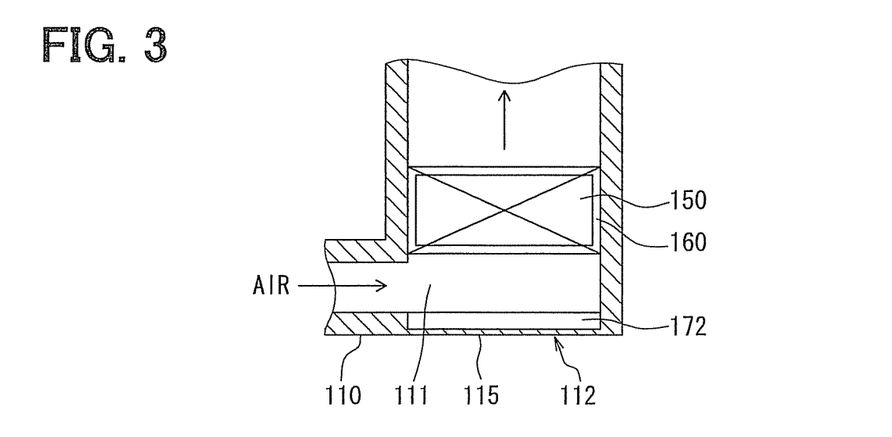
FIG. 3 is a schematic cross-sectional view illustrating an emitting portion of an air conditioner according to a second embodiment.

The emitting portion 171 of the first embodiment is modified into an emitting portion 172 in a second embodiment, as shown in FIG. 3. The emitting portion 172 is a face light source having a board shape and emitting light from the whole board face.

Specifically, an electroluminescent (EL) lamp 172 is used as a surface-shaped light emitting source, so that the whole face of the EL lamp 172 shines when voltage is applied. The EL lamp 172 is arranged on the wall part 115 of the air conditioning case 110, similarly to the first embodiment.

The EL lamp 172 corresponds to the face light source having the board shape and emitting light from the whole board face. Therefore, similarly to the first embodiment, the condensation water can be easily drained, due to the super-hydrophilic action of the photocatalyst 160, and the thermal resistance can be restricted from increasing. The odor component can be decomposed without causing the increase in the ventilation air resistance.

Third Embodiment

Figure 4:
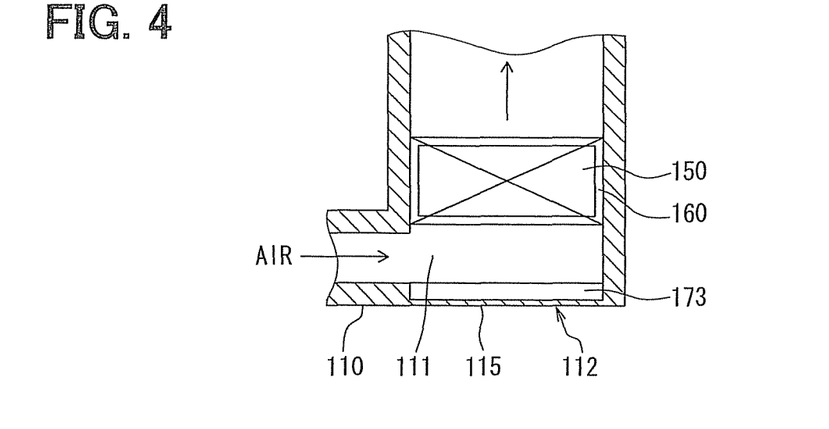
FIG. 4 is a schematic cross-sectional view illustrating an emitting portion of an air conditioner according to a third embodiment.
Figure 5:
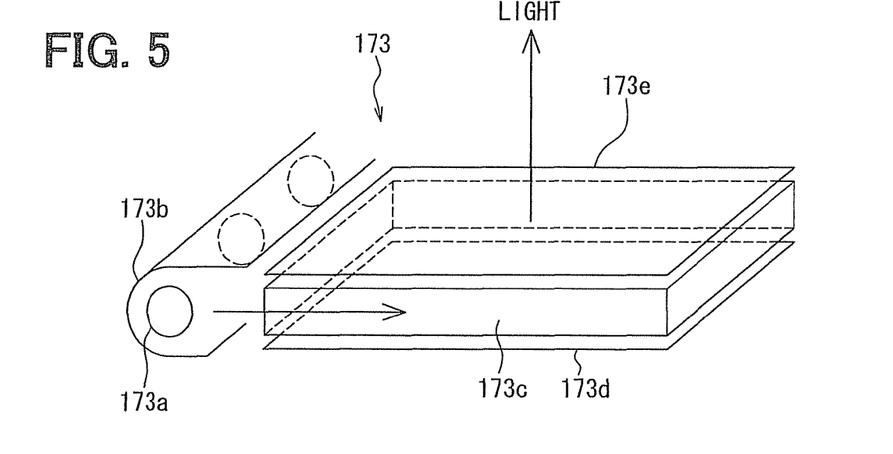
FIG. 5 is a schematic perspective view illustrating the emitting portion of the third embodiment.

The emitting portion 171 of the first embodiment is modified into an emitting portion 173 in a third embodiment, as shown in FIGS. 4 and 5. The emitting portion 173 is a parallel-light light source, and has a LED 173a as a light source, and a light introducing plate 173c that guides the light emitted from the LED 173a.

A plurality of the LEDs 173a is arranged along a side of the plate 173c, and is held to the plate 173c by a holding part 173b.

The light introducing plate 173c is made of translucent resin, and is a square-shaped board. The resin material may be made of acrylic-base resin, polycarbonate-base resin, for example. A reflective sheet 173d is layered on a face of the light introducing plate 173c, and works as a light reflecting face. A diffusion sheet 173e is layered on the opposite face of the plate 173c, and works as a light emission face.

Plural dots are defined on the reflective sheet 173d, and the light is reflected from the reflector side to the emission side. The diffusion sheet 173e is a sheet which diffuses the light coming from the reflector side and emitting from the emission face. The emission face of the emitting portion 173 opposes to the evaporator 150. The emitting portion 173 is arranged on the wall part 115 of the air conditioning case 110, similarly to the first embodiment.

In the light introducing plate 173c, the light emitted from the LED 173b repeats the reflection between the reflector face and the emission face of the light introducing plate 173c, and moves from a first side adjacent to the LED 173b to a second side away from the LED 173b. The reflected light is formed by the reflective sheet 173d from the reflector side to the emission side. Furthermore, the light is diffused by the diffusion sheet 173e on the emission side, and the diffused light is emitted toward the evaporator 150.

Basis construction of the air conditioner of the third embodiment is approximately the same as the first and second embodiments except the emitting portion 173, so that approximately the same advantage can be obtained in the third embodiment, as the first and second embodiments.

Figure 6:
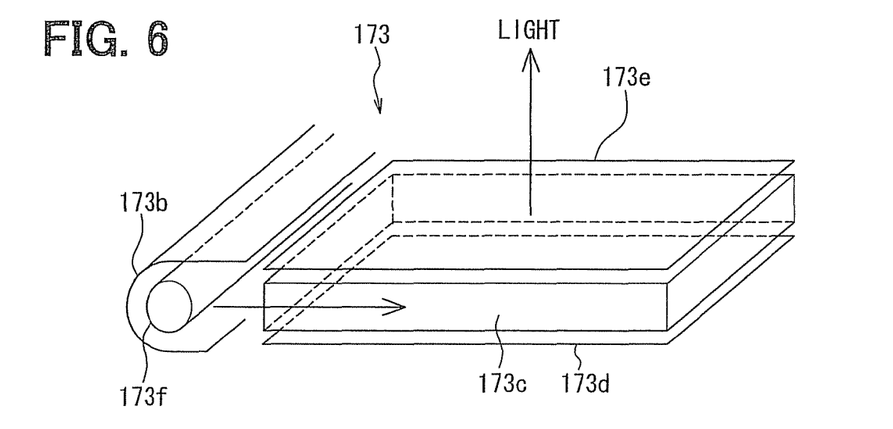
FIG. 6 is a schematic perspective view illustrating a modification example of the emitting portion of the third embodiment.

The light source of the emitting portion 173 may be changed from the LEDs 173a of FIG. 5 into a tube-shaped light source 173f shown in FIG. 6. In this case, the single tube-shaped light source is arranged along the side of the light introducing plate 173c, an that the tube-shaped light source 173f can be easily attached to the light introducing plate 173c than the LEDs 173a.

Fourth Embodiment

Figure 7:
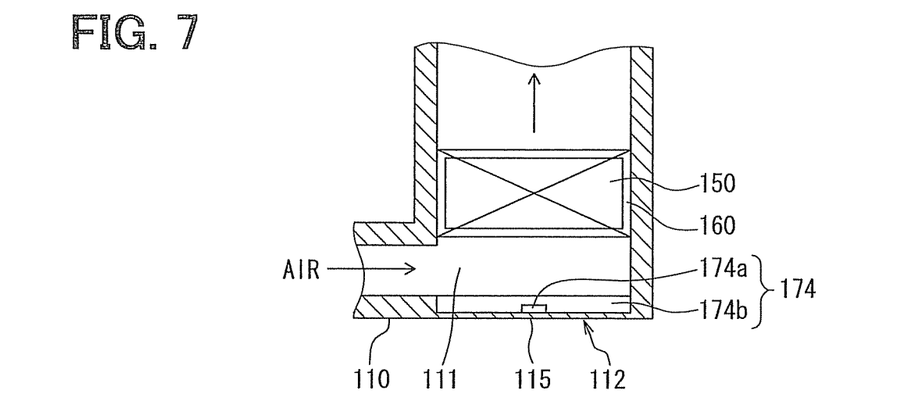
FIG. 7 is a schematic cross-sectional view illustrating an emitting portion of an air conditioner according to a fourth embodiment.

The emitting portion 171 of the first embodiment is modified into an emitting portion 174 in a fourth embodiment, as shown in FIG. 7. The emitting portion 174 is a parallel-light light source, and has a LED 174a as a light source part and a diffusion plate 174b.

The LED 174a corresponding to the light source is arranged on the wall part 115. The diffusion board 174b is a translucent board member which scatters or diffuses the light emitted from the LED 174a. The diffusion board 174b is located adjacent to the evaporator 150 rather than the LED 174a, in the wall part 115. In the emitting portion 174, the light emitted from the LED 174a spreads in the whole field of the diffusion board 174b, and is emitted toward the evaporator 150 from the whole face.

Basis construction of the air conditioner of the fourth embodiment is approximately the same as the first to third embodiments except the emitting portion 174, so that approximately the same advantage can be obtained in the fourth embodiment, as the first to third embodiments.

Figure 8:
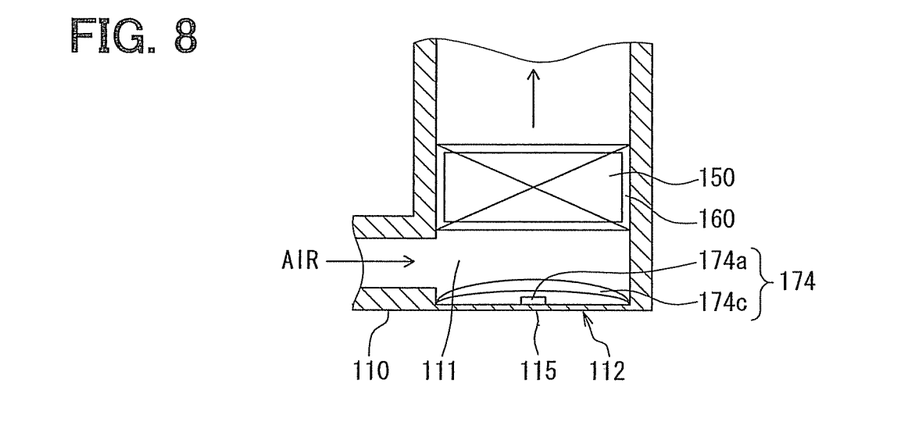
FIG. 8 is a schematic cross-sectional view illustrating a modification example of the emitting portion of the fourth embodiment.

The diffusion board 174b of the emitting portion 174 may be exchanged with a lens (convex lens) 174c shown in FIG. 8. In this case, the LED 174a is located at the focus position of the lens 174c. The light emitted from the LED 174a is expanded to the whole board face of the lens 174c, and the parallel light can be emitted from the emitting portion 174 as the parallel-light light source. That is, the light can be emitted from the emitting portion 174 uniformly to the evaporator 150.

Fifth Embodiment

Figure 9:
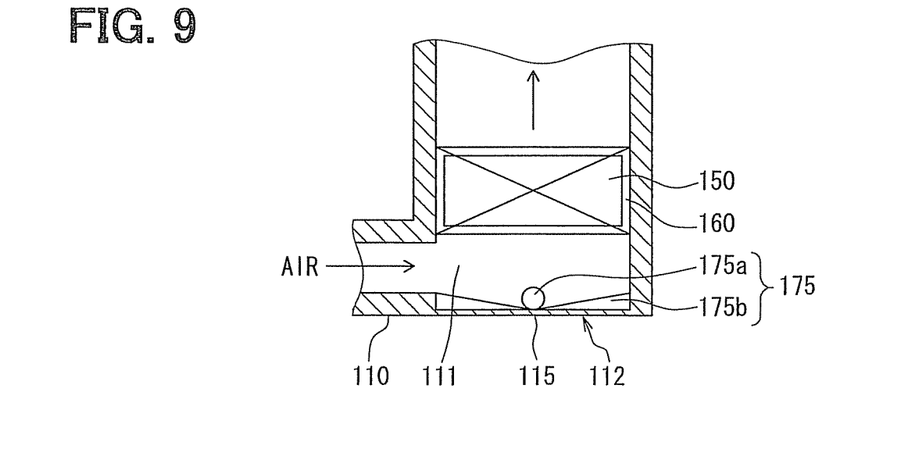
FIG. 9 is a schematic cross-sectional view illustrating an emitting portion of an air conditioner according to a fifth embodiment.

The emitting portion 171 of the first embodiment is modified into an emitting portion 175 in a fifth embodiment, as shown in FIG. 9. The emitting portion 175 is a parallel-light light source, and has a tube-shaped light source 175a and a reflector plate 175b.

The reflector plate 175b is a board member which reflects the light emitted from the light source 175a. A thickness of the plate 175b is made thinner from the periphery ends toward the center section, so that the center section of the plate 175b has a recessed shape. The reflector plate 175b is arranged on the wall part 115 so that the recessed part opposes to the evaporator 150.

The tube-shaped light source 175a is arranged on the plate 175b so as to face the evaporator 150, and extends along the recessed part of the reflector plate 175b. In the emitting portion 175, the light emitted from the light source 175a is reflected by the reflector plate 175b from the whole face of the reflector plate 175b, and the reflected light is emitted toward the evaporator 150.

Basis construction of the air conditioner of the fifth embodiment is approximately the same as the first to fourth embodiments except the emitting portion 175, so that approximately the same advantage can be obtained in the fifth embodiment, as the first to fourth embodiments.

Figure 10:
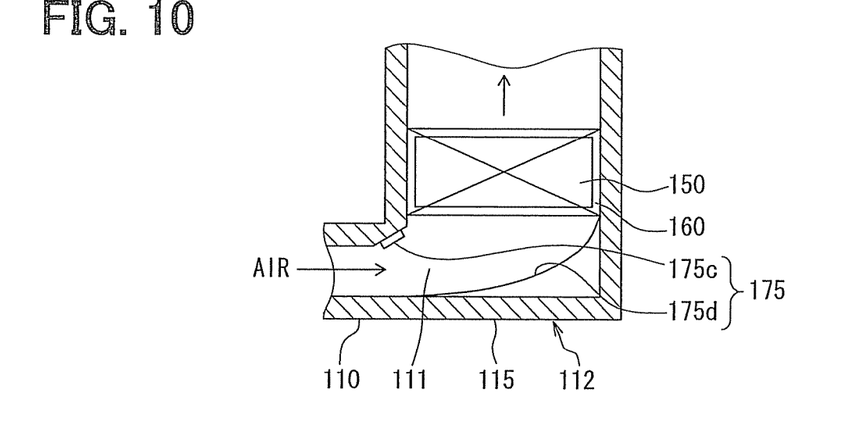
FIG. 10 is a schematic cross-sectional view illustrating a modification example of the emitting portion of the fifth embodiment.

As shown in FIG. 10, the emitting portion 175 may have a LED 175c and a reflective sheet (reflecting plate) 175d having a parabola shape. The reflective sheet 175d is arranged on the wall part 115. The LED 175c is arranged on a wall part that is located at an inner angled position of the bent portion 112, and is located at a position corresponding to the focus of the parabola shape of the reflective sheet 175d.

Therefore, the light of the LED 175c emitted from the focus position can be made into a parallel light over the whole face of the sheet 175d, and the parallel light can be emitted from the parabola-shaped sheet 175d toward the evaporator 150. That is, light can be emitted from the emitting portion 175 uniformly to the evaporator 150.

Sixth Embodiment

Figure 11:
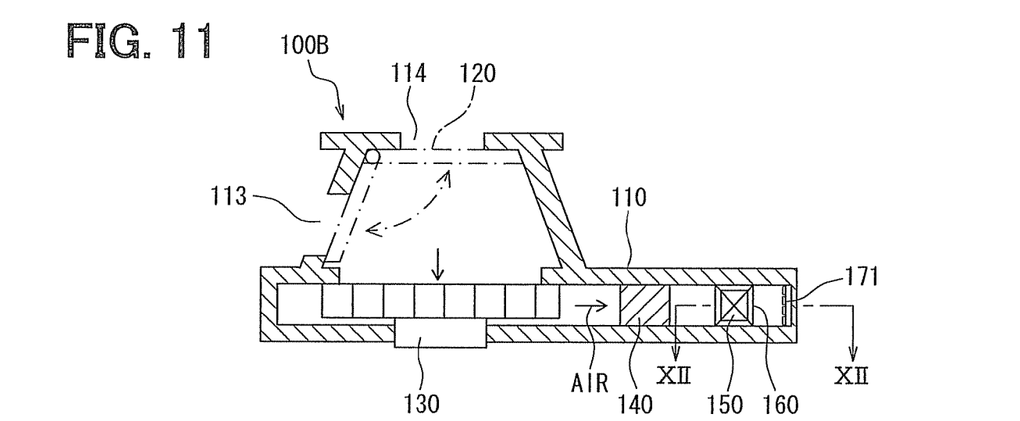
FIG. 11 is a schematic cross-sectional view illustrating an air conditioner according to a sixth embodiment.
Figure 12:
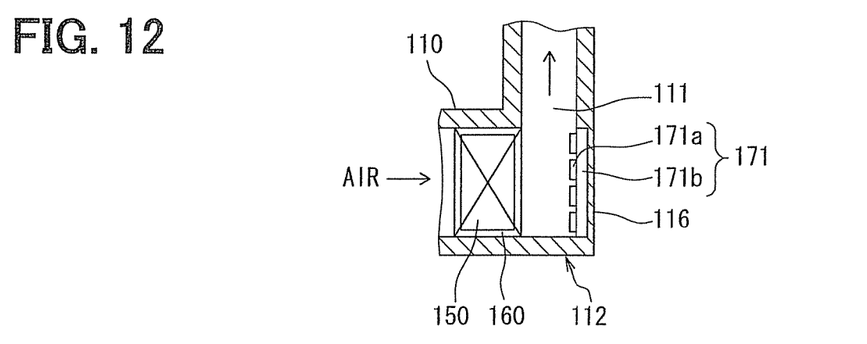
FIG. 12 is a schematic cross-sectional view illustrating an emitting portion of the air conditioner of the sixth embodiment.

An air conditioner 100B of a sixth embodiment will be described with reference to FIGS. 11 and 12. In the sixth embodiment, the position relationship between the evaporator 150 and the emitting portion 171 is modified relative to the first embodiment.

The evaporator 150 is located upstream of the bent portion 112 of the case 110 so as to cross the air passage 111. As shown in FIG. 12, the emitting portion 171 is arranged on a wall part 116 defining the bent portion 112 downstream of the evaporator 150, and the wall part 116 having the emitting portion 172 opposes to the heat exchanger part of the evaporator 150.

According to the sixth embodiment, the emitting portion 171 is located to be parallel with the wall part 116, and does not cross the air passage 111 in the air conditioning case 110. Therefore, deodorization can be performed in the evaporator 150 by the photocatalyst 160, without causing the increase in the ventilation air resistance in the air conditioning case 110.

In addition, in the sixth embodiment, the emitting portion 171 may be exchanged with the emitting portion 172-175 explained in the second to fifth embodiment.

Seventh Embodiment

An emitting portion 176 of an air conditioner 100C according to a seventh embodiment will be described with reference to FIG. 13. In the seventh embodiment, the shapes of the bent portion 112 and the emitting portion 173 of the third embodiment are modified into a bent portion 112A and the emitting portion 176, respectively.

The bent portion 112A of the air-conditioning case 110 has a smoothly bent shape so as not to generate a disturbance in the flow of the air for conditioning and so as not to have interference with other component located adjacent to the case 110 when the air conditioner 100C is mounted to the vehicle. That is, the wall part 115A of the bent portion 112A has a curved surface.

The emitting portion 176 is a parallel-light light source, and has a LED 173a corresponding to a light source and a light introducing board 173cA. The light introducing board 173cA has a board shape extending along the curved surface of the wall part 115A, and is disposed on the wall part 115A.

Figure 13:
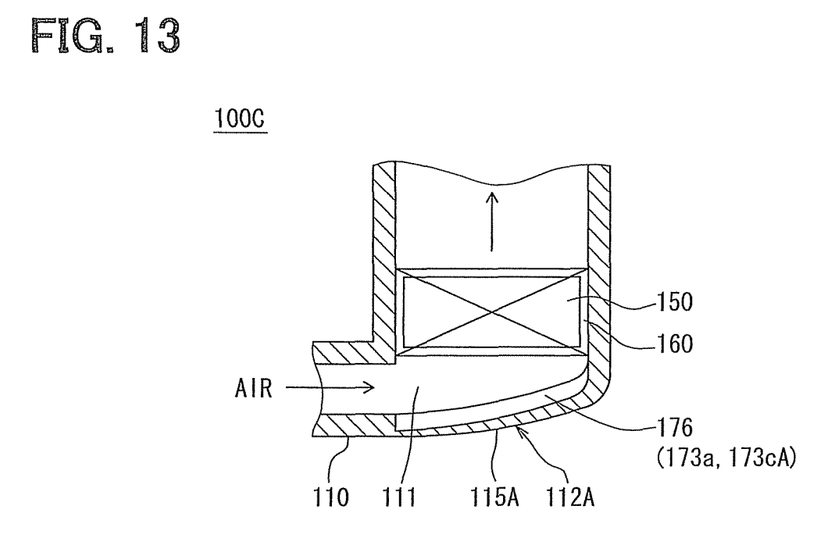
FIG. 13 is a schematic cross-sectional view illustrating an emitting portion of an air conditioner according to a seventh embodiment.

Similarly to the third embodiment, the LED 173a is held in the board 173cA by a holding part 173b (not shown in FIG. 13). Further, the board 173cA has a reflecting sheet 173d and a diffusion sheet 173e (which are not shown in FIG. 13).

Basic construction in the seventh embodiment is similar to that in the third embodiment except the shapes of the bent portion 112A and the emitting portion 176, so that similar advantages are obtained in the seventh embodiment.

According to the seventh embodiment, the emitting portion 176 and the light introducing board 173cA are formed along the curved surface of the wall part, when the wall part 115A of the bent portion 112A is formed into the shape of the curved surface. Therefore, the emitting portion 176 has no protruding part protruding into the air passage 111 in the case 110. Thus, the deodorization can be achieved in the evaporator 150 using the photocatalyst 160 while the ventilation resistance is restricted from increasing in the case 110 even when the emitting portion 176 is provided.

The seventh embodiment may be a modification of the first, second, fourth to sixth embodiment other than the third embodiment. If the bent portion 112 (the wall part 115, 116) is modified into the bent portion 112A, the heat radiating board 171b of the first embodiment, the EL lamp 172 of the second embodiment, the diffusion board 174b and the lens 174c of the fourth embodiment, the reflection board 175b and the reflection sheet 175d of the fifth embodiment or the heat radiating board 171b of the sixth embodiment is formed along the bent portion 112A.

Other Embodiments

The shape and the construction of the air-conditioner 100A, 100B, 100C may be modified without being limited to the above description. For example, the switching door 120 may be made of a film door, a rotary door, a slide door, for example, other that the board door.

Such changes and modifications are to be understood as being within the scope of the present invention as defined by the appended claims.

What is claimed is:

1. An air conditioner comprising:
   an air conditioning case having an air passage;
   a heat exchanger arranged to cross the air passage in the air conditioning case, the heat exchanger cooling air for conditioning in the air conditioning case;
   a photocatalyst arranged on a surface of the heat exchanger, the photocatalyst decomposing odor components contained in the air for conditioning; and
   an emitting portion which emits light for activating the photocatalyst, wherein
   the air conditioning case has a bent portion upstream or downstream of the heat exchanger, so as to change a flowing direction of the air for conditioning,
   the emitting portion is disposed on a wall part of the bent portion,
   the wall part is located to oppose to the heat exchanger,
   the emitting portion has a light introducing board, and a light source arranged on a lateral side of the light introducing board, and the light introducing board has a light emitting surface which emits light emitted from the light source.

2. The air conditioner according to claim 1, wherein the wall part of the bent portion has a curved surface, and the emitting portion is arranged along the curved surface of the wall part.

3. The air conditioner according to claim 1, wherein the heat exchanger is located downstream of the bent portion in a flow of the air for conditioning, and the emitting portion is located upstream of the heat exchanger in the flow of the air for conditioning.

4. The air conditioner according to claim 1, wherein the light emitted from the light source is changed into a parallel light, and the emitting portion emits the parallel light.

5. The air conditioner according to claim 1, wherein the emitting portion is a face light source having a board shape and emitting light from the whole face of the board shape, and the face light source is an electroluminescent lamp.

6. The air conditioner according to claim 4, wherein the light source is one of a plurality of light sources, and the plurality of light sources are arranged to be distanced from each other in a plane shape or a curved shape.

7. The air conditioner according to claim 4, wherein the light introducing board has a top face and a back face, and the light introducing board emits light emitted from the light source from the back face to the top face.

8. The air conditioner according to claim 4, wherein the emitting portion further includes a diffusion board, and the diffusion board diffuses light emitted from the light source over the whole part of the diffusion board.

9. The air conditioner according to claim 8, wherein the diffusion board is a lens.

10. The air conditioner according to claim 4, wherein the emitting portion further includes a reflector board, and the reflector board reflects light emitted from the light source so as to diffuse the light over the whole part of the reflector board.

11. The air conditioner according to claim 10, wherein the reflector board has a refection face having a parabola shape, and the light source is located at a focus position of the parabola shape.

12. The air conditioner according to claim 1, wherein the light source is positioned in a same plane as the light introducing board such that the light emitted from the light source travels inside of the light introducing board approximately parallel to the light introducing board.

13. The air conditioner according to claim 12, wherein the light introducing board has a diffusion sheet on the light emitting surface, and a reflective sheet on an opposite surface of the light introducing board that is opposite to the light emitting surface, and the light emitted from the light source is reflected between the diffusion sheet and the reflective sheet when the light emitted from the light source travels inside of the light introducing board approximately parallel to the light introducing board.

14. An air conditioner comprising:
an air conditioning case having an air passage;
a heat exchanger arranged to cross the air passage in the air conditioning case, the heat exchanger cooling air for conditioning in the air conditioning case;
a photocatalyst arranged on a surface of the heat exchanger, the photocatalyst decomposing odor component contained in the air for conditioning; and
an emitting portion which emits light for activating the photocatalyst, wherein
the air conditioning case has a bent portion at upstream or downstream of the heat exchanger, so as to change a flowing direction of the air for conditioning,
the emitting portion is disposed on a wall part of the bent portion,
the wall part is located to oppose to the heat exchanger,
the heat exchanger is located downstream of the bent portion in a flow of the air for conditioning, and
the emitting portion is located upstream of the heat exchanger in the flow of the air for conditioning.

15. An air conditioner comprising:
an air conditioning case having an air passage;
a heat exchanger arranged to cross the air passage in the air conditioning case, the heat exchanger cooling air for conditioning in the air conditioning case;
a photocatalyst arranged on a surface of the heat exchanger, the photocatalyst decomposing odor component contained in the air for conditioning; and
an emitting portion which emits light for activating the photocatalyst, wherein
the air conditioning case has a bent portion at upstream or downstream of the heat exchanger, so as to change a flowing direction of the air for conditioning,
the emitting portion is disposed on a wall part of the bent portion,
the wall part is located to oppose to the heat exchanger,
the emitting portion includes a light source emitting a light, wherein the light emitted from the light source is changed into a parallel light,
the emitting portion emits the parallel light,
the emitting portion further includes a reflector board, and
the reflector board reflects light emitted from the light source so as to diffuse the light over the whole part of the reflector board.

16. The air conditioner according to claim 15, wherein the reflector board has a reflection face having a parabola shape, and
the light source is located at a focus position of the parabola shape.

* * * * *